[12] United States Patent  
Komatsu

(10) Patent No.: US 8,243,308 B2
(45) Date of Patent: Aug. 14, 2012

(54) IMAGE PROCESSING APPARATUS FOR SETTING IMAGE QUALITY MODE AND PROCESSING IMAGE DATA BASED ON SUPPLEMENTAL INFORMATION

(75) Inventor: Manabu Komatsu, Tokyo (JP)

(73) Assignee: Ricoh Company, Ltd., Toyko (JP)

( * ) Notice: Subject to any disclaimer, the term of this patent is extended or adjusted under 35 U.S.C. 154(b) by 919 days.

(21) Appl. No.: 12/021,562

(22) Filed: Jan. 29, 2008

(65) Prior Publication Data

US 2008/0186533 A1  Aug. 7, 2008

(30) Foreign Application Priority Data

Feb. 5, 2007  (JP) ................. 2007-025768

(51) Int. Cl.
*H04N 1/40* (2006.01)
*G03F 3/08* (2006.01)
*G06K 9/00* (2006.01)

(52) U.S. Cl. ....... 358/1.15; 358/452; 358/453; 358/519; 358/520; 358/521; 358/523; 382/165; 382/166; 382/167

(58) Field of Classification Search .................. None
See application file for complete search history.

(56) References Cited

U.S. PATENT DOCUMENTS

| 2003/0123092 | A1* | 7/2003 | Toda | 358/2.1 |
| 2004/0042019 | A1* | 3/2004 | Moro | 358/1.9 |
| 2004/0125404 | A1 | 7/2004 | Isshiki | |
| 2006/0028664 | A1 | 2/2006 | Ono | |
| 2006/0056713 | A1 | 3/2006 | Ito et al. | |
| 2006/0072163 | A1 | 4/2006 | Ito et al. | |
| 2006/0279813 | A1 | 12/2006 | Ozawa et al. | |

FOREIGN PATENT DOCUMENTS

| JP | 09186866 | * | 7/1997 |
| JP | 9-233324 | | 9/1997 |
| JP | 3134756 | | 12/2000 |
| JP | 3368143 | | 11/2002 |
| JP | 3695498 | | 7/2005 |
| JP | 2006-33320 | | 2/2006 |
| JP | 2007-88783 | | 4/2007 |

OTHER PUBLICATIONS

Suzuki Yuzuru; Image processing unit and Image processing method; JP Pub Date Jul. 1997; English machine translation of JP Pub No. 09-186866.*

(Continued)

*Primary Examiner* — Benny Q Tieu
*Assistant Examiner* — Haris Sabah
(74) *Attorney, Agent, or Firm* — Cooper & Dunham LLP

(57) ABSTRACT

A first image-data processing unit unifies characteristics of input image data so that the image data is usable in an image writing unit and an external device, stores characteristic-unified image data in a storing unit, and changes an attribute of supplemental information according to an image input condition. When converting target image data into image data with characteristics suitable for outputting to the image writing unit and an external interface unit, a second image-data processing unit makes the stored image data be reusable in the image writing unit and the external device by performing an image processing based on the supplemental information.

13 Claims, 9 Drawing Sheets

OTHER PUBLICATIONS

Arai et al.; Image processing apparatus; JP Pub Date Feb. 2006; English machine translation of JP Pub No. 2006-033320.*

Arai et al.; "Image Processing Apparatus"; JP Pub Date Feb. 2006; Machine Translation in English of JP Pub No. 2006033320 Suzuki Yuzuru; "Image Processing . . . Processing Method"; JP Pub Date Jul. 1997; Machine Translation of JP Pub No. 09186866.*

Jun. 18, 2010 European official action in connection with counterpart European patent application No. EP 08250159.

Feb. 22, 2011 Japanese official action in connection with a counterpart Japanese patent application.

May 24, 2011 Japanese official action in connection with a counterpart Japanese patent application.

* cited by examiner

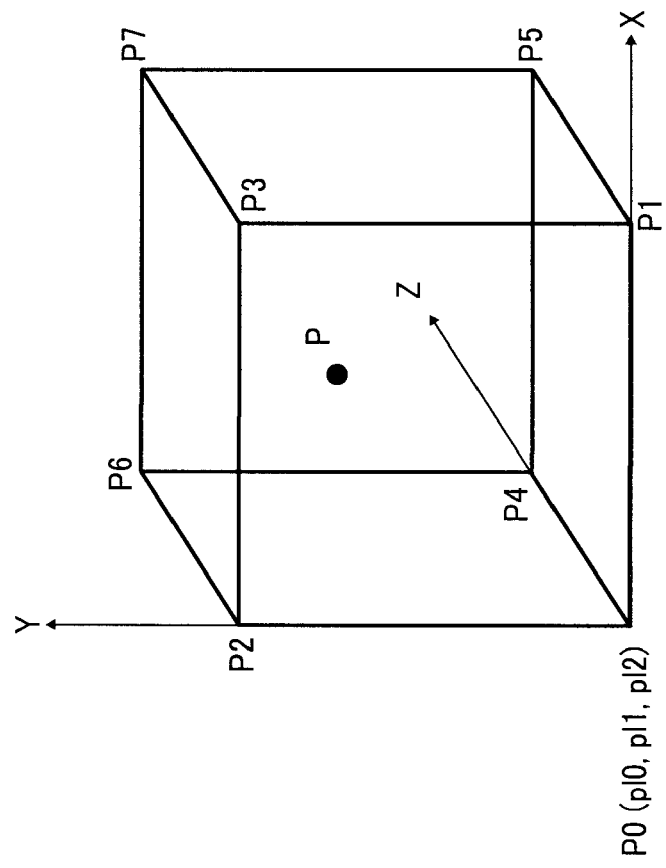
FIG. 6
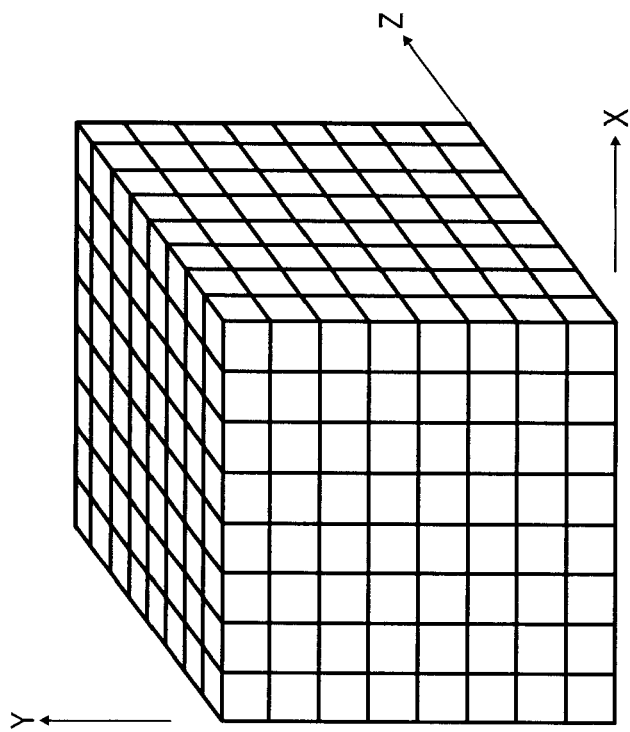

FIG. 8

INTERPOLATION COEFFICIENT LIST

| CONDITION | TETRA-HEDRON | COEFFICIENT $K_0$ | COEFFICIENT $K_1$ | COEFFICIENT $K_2$ | COEFFICIENT $K_3$ |
|---|---|---|---|---|---|
| $(\Delta x < \Delta y < \Delta z)$ | T0 | P7 – P6 | P6 – P4 | P4 – P0 | P0 |
| $(\Delta y \leq \Delta x < \Delta z)$ | T1 | P5 – P4 | P7 – P5 | P4 – P0 | P0 |
| $(\Delta y < \Delta z \leq \Delta x)$ | T2 | P1 – P0 | P7 – P5 | P5 – P1 | P0 |
| $(\Delta z \leq \Delta y \leq \Delta x)$ | T3 | P1 – P0 | P3 – P1 | P7 – P3 | P0 |
| $(\Delta z \leq \Delta x < \Delta y)$ | T4 | P3 – P2 | P2 – P0 | P7 – P3 | P0 |
| $(\Delta x < \Delta z \leq \Delta y)$ | T5 | P7 – P6 | P2 – P0 | P6 – P2 | P0 |

IMAGE PROCESSING APPARATUS FOR SETTING IMAGE QUALITY MODE AND PROCESSING IMAGE DATA BASED ON SUPPLEMENTAL INFORMATION

CROSS-REFERENCE TO RELATED APPLICATIONS

The present application claims priority to and incorporates by reference the entire contents of Japanese priority document 2007-025768 filed in Japan on Feb. 5, 2007.

BACKGROUND OF THE INVENTION

1. Technical Field of the Invention

This disclosure relates to a technology for processing digital image data in a digital multifunction product (MFP) and in an image processing apparatus.

2. Description of the Related Art

Technologies of an image reading unit using a line sensor formed with a charge-coupled device (CCD) or a photoelectric transducer and of a toner-image writing unit using laser radiation have advanced. Based on the advanced technologies and from analog copiers, digital copiers that copy images using digitized image data have appeared on the market.

The digital copier has high compatibility with other units that handle digital image data, and is combined with not only a function of a copier but also with various functions such as a facsimile function, a printer function, and a scanner function. Therefore, the digital copier is not a simple digital copier, but is called "digital multifunction product (MFP)".

Varieties of functions are incorporated in the MFP in association with the progress in the technologies related to the MFP such as increased memory capacity of a hard disk drive (HDD), reduction in costs, speeding-up and spread of the communication technology such as networks, improved throughput of central processing unit (CPU), and technologies related to digital image data such as compression technology.

Meantime, the MFP is used in various ways. For example, a compact MFP is set next to a personal computer (PC) so that an operator can easily use the functions of a copier, a facsimile, a printer, and a scanner. A medium-scale MFP is shared by a plurality of members in a department or in a section so that the members can use functions of achieving a certain amount of productivity such as sorting, punching, and stapling. Alternatively, a large-scale, highly productive, high-quality MFP is used in a department of companies that concentratedly performs a copy-related work or used in companies that perform a copy-related service as business.

As explained above, the MFP is diversified into various types from a compact class to a large-scale class. Some of the functions of the MFP are shared by the classes, but some of the functions are strongly required in each particular class.

For example, post-processes for paper after an image is plotted thereon such as punching, stapling, and folding the paper, and electro-filing performed simultaneously with copy work are required for the large-scale MFP. On the other hand, provision of an Internet-FAX function and a PC-FAX function is required for the compact MFP, and as a personal use, high-quality image printing for special paper is also required for the compact MFP.

New and various types of functions are provided in the MFP, and it is desired to provide further new functions and a combination of a plurality of functions. Conventionally, a system is constructed so as to incorporate a set of functions required for all classes therein, and is provided to diversified MFP market.

It is recognized that the value of information is important in business, and information is therefore required to be delivered not only quickly, accurately, and reliably, but also understandably and effectively. A new function of effectively handling information using digital data is provided in association with speeding-up and spread of communication technology, increased capacity of memory, reduction in costs thereof, and downsizing thereof, and high performance of PC. Therefore, provision of a new function and a combination of the functions are desired also in the MFP that handles digital image data which is one of digital data.

The provision of a new function and the combination of functions progress in the above manner, and it thereby becomes important for a digital color MFP including various color image input/output units to minimize the increase in costs as low as possible and obtain output images with less degradation in image quality.

To solve the problems, in Japanese Patent No. 3134756, input image data and image-area separation data generated by an image-area separating unit are compressed and stored, and when it is to be output, expanded image data is subjected to image processing based on a detected image attribute and the image-area separation data.

In Japanese Patent No. 3368143, predetermined logic operation is subjected to information described in a page description language based on a type, a category, and an attribute of an image to generate a characteristic signal, and image processing is performed for each pixel according to the characteristic signal.

In Japanese Patent No. 3695498, when an image file described in a predetermined format is interpreted and expanded to image data, tag data indicating an attribute is also generated for each pixel, and the generated data is compressed and stored. And a time at which these pieces of image data are read in a time division mode is variably controlled.

The increased capacity and reduction in costs of memory are combined with the functions of the MFP. Recently, in association with the combination, the following usage of the MFP is increased. Digital image data created by reading a paper document and digital image data sent from a PC or external media are stored in the MFP, and are output again when these pieces of information are required.

When the digital image data stored in the MFP is to be output again, a certain time has often passed since the data has been stored. Therefore, situations i.e. requirements and needs of an operator who wants to re-output the data may often change during the time, and thus, the functions of the MFP cannot respond to the change of the requirements and needs. For example, when the operator wants to facsimile-transmit the digital image data which is stored in the MFP upon using the copier function, the data cannot be used in a required manner, or even if possible, the image quality may be greatly changed or productivity may decrease significantly.

There is also a case where, when the copier function is used in such a manner that two A4 documents are combined in a sheet of A4 recording medium, such image data is stored in the MFP. When the stored image data for the two A4 documents are to be plotted on two sheets of A4 recording medium, the image data cannot be output in that mode, or even if possible, the image quality may be greatly changed or productivity may drop significantly.

In both cases, it is fundamental for the digital color MFP including various color image input/output units to minimize the increase in costs as low as possible and generate output images with less degradation in image quality. However, to obtain high quality output images, it is necessary to handle supplemental information indicating features of input image data as well as the input image data, as described in Japanese Patent No. 3134756 on a paper document and in Japanese Patent No. 3368143 on an image file sent from a PC and a network.

In an actual case, it is necessary to compress and store the input image data and the image-area separation data generated by the image-area separating unit as described in Japanese Patent No. 3134756. However, to minimize degradation in image quality as low as possible, especially the image-area separation data indicating the feature of each pixel is desirably reversible. Therefore, if the entire image attribute and the image-area separation data detected by the image-area separating unit are stored, this leads to a large increase in costs.

BRIEF SUMMARY OF THE INVENTION

According to an aspect of this disclosure, there is provided an image processing apparatus including an image reading unit that reads a document to obtain electronic image data; an image writing unit that prints the image data on a recording medium; a storing unit that stores therein the image data and supplemental information of the image data; an external interface unit that exchanges the image data and the supplemental information with an external device; a first image-data processing unit that processes first image data input from the image reading unit; and a second image-data processing unit that processes second image data stored in the storing unit. The first image-data processing unit unifies characteristics of the first image data in such a manner that the first image data is usable in both the image writing unit and the external device, stores characteristic-unified image data in the storing unit, and changes an attribute of the supplemental information to be stored together with the image data according to an image input condition in the image reading unit. When converting target image data to be processed into image data with characteristics suitable for outputting to the image writing unit and the external interface unit, the second image-data processing unit makes the first image data stored in the storing unit be reusable in both the image writing unit and the external device by performing an image processing on the target image data based on the supplemental information stored in the storing unit.

The aforementioned and other aspects, features, advantages and technical and industrial significance will be better understood by reading the following detailed description, when considered in connection with the accompanying drawings.

BRIEF DESCRIPTION OF THE DRAWINGS

FIG. 6 is a schematic diagram of output values P0 to P7 at grid points;

FIG. 8 is a table of determination rules for interpolation coefficients common among individual separation signals.

DETAILED DESCRIPTION OF THE PREFERRED EMBODIMENTS

Exemplary embodiments of the present invention are explained in detail below with reference to the accompanying drawings.

Figure 1:
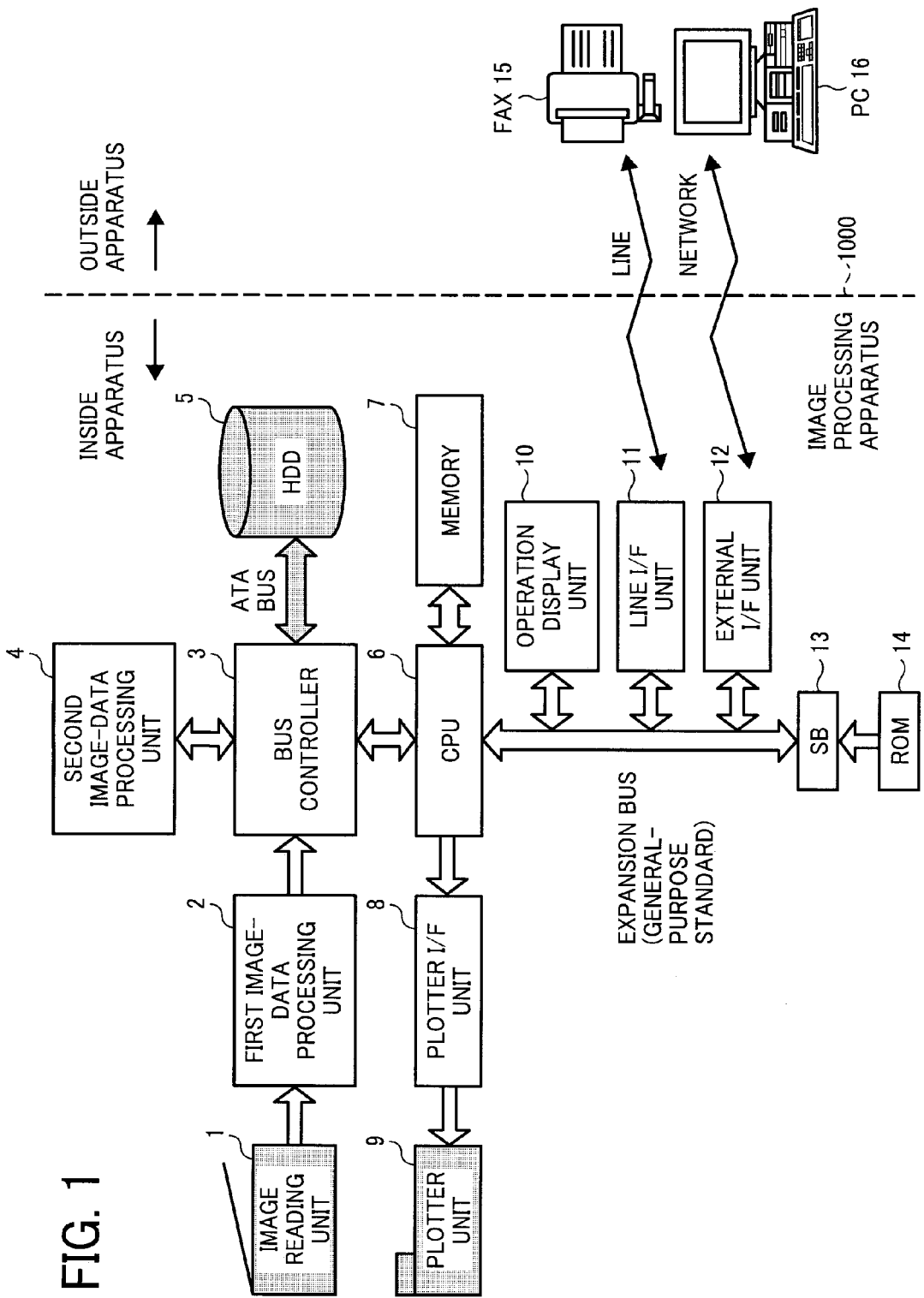
FIG. 1 is a schematic diagram of an entire configuration of an image processing apparatus according to an exemplary embodiment of the present invention.

FIG. 1 is a schematic diagram of an entire configuration of an MFP 1000 as an image processing apparatus according to the present invention.

In FIG. 1, an image reading unit 1 includes a line sensor formed with a CCD photoelectric conversion element, an analog-to-digital (A/D) converting unit, and a drive circuit. The image reading unit 1 scans a set document to obtain grayscale information for the document, and generates each of 8-bit red, green, and blue (RGB) digital image data from the grayscale information and outputs the generated image data.

A first image-data processing unit 2 subjects the digital image data received from the image reading unit 1 to a process so as to be united into a preset feature, and outputs the processed image data.

Figure 2:
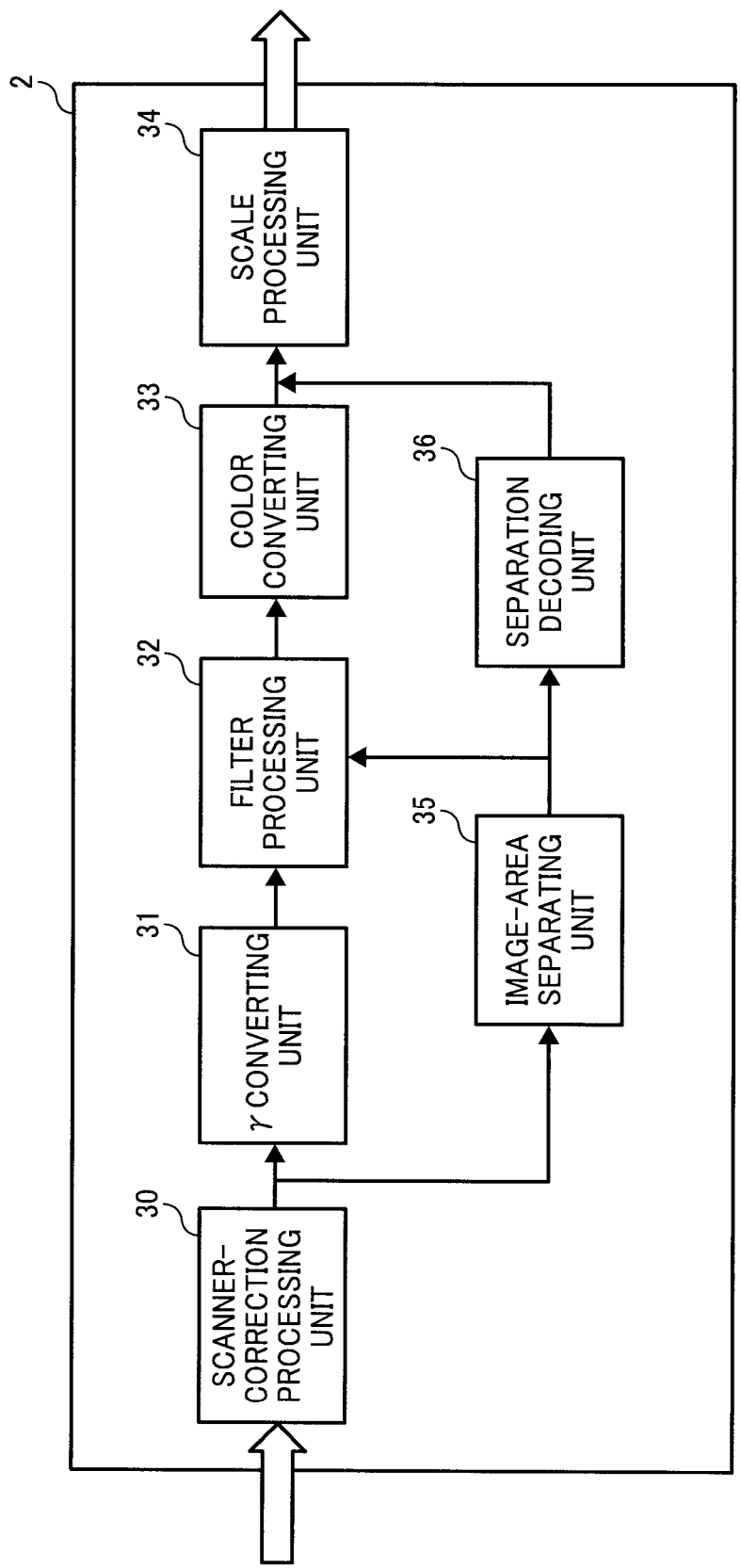
FIG. 2 is a schematic diagram of a detailed configuration of a first image-data processing unit.

The detailed configuration of the first image-data processing unit 2 is explained below with reference to FIG. 2.

A scanner-correction processing unit 30 corrects shading or uneven reading of the digital image data received from the image reading unit 1 shown in FIG. 1 which may occur caused by a mechanism of the image reading unit 1 (scanner) such as uneven illumination.

A filter processing unit 32 corrects a modulation transfer function (MTF) characteristic of the scanner, changes a frequency characteristic of the read image to prevent moiré, and makes the image sharp and smooth. Basically, a γ converting unit 31 and a color converting unit 33 process the image data so that the characteristics thereof are made uniform, and the image data with the uniform characteristics is stored in the MFP. Thereafter, when the image data is to be reused, the image data is converted to an image signal suitable for the characteristic of an output destination. The details thereof are explained later.

An image-area separating unit 35 extracts a characteristic area of the document. For example, the extraction includes those of a halftone-dot portion formed by an ordinary printing and of an edge such as a character. The image-area separating unit 35 also determines whether the image data is chromatic and whether a background is white, which means a background image is white. A separation decoding unit 36 decodes an image-area separation signal sent from the image-area separating unit 35 into an amount of information required for the process at the subsequent stage in a second image-data processing unit 4 shown in FIG. 1, and outputs the decoded information. For example, a 7-bit image-area separation signal sent from the image-area separating unit 35 is as shown below.

CH2: character inside area (1)/non-character inside area (0)

CHR: character (1)/non-character (0)

HT: dense dots due to a large number of scan lines (1)/non-dense dots (0)

CW: chromatic (1)/non-chromatic <achromatic> (0)

WS: white background (1)/non-white background (0)

LHT: coarse dots due to a small number of scan lines (1)/non-coarse dots (0)

T: tracking pattern (1)/non-tracking pattern (0)

The 7-bit image-area separation signal is decoded so that each state of "black character, chromatic character, character inside area, character on halftone dots, dense dots due to a large number of scan lines, coarse dots due to a small number of scan lines, photograph, and tracking pattern" can be expressed with 3 bits. Alternatively, the 7-bit image-area separation signal is decoded so that each state of "black character, chromatic character, character inside area, and non-character" can be expressed with 2 bits.

Referring back to FIG. 1, a bus controller 3 is a controller of a data bus that exchanges image data and various data such as control commands between components required in the MFP 1000. The bus controller 3 also has a function of bridging between a plurality of types of bus standards.

In the present embodiment, the bus controller 3 is connected to the first image-data processing unit 2, the second image-data processing unit 4, and a CPU 6 through a peripheral component interconnect (PCI)-express bus, and is connected to an HDD 5 through an AT Attachment (ATA) bus, so as to form an application specific integrated circuit (ASIC).

The second image-data processing unit 4 subjects the digital image data of which characteristics are made uniform so as to have the characteristics preset in the first image-data processing unit 2 and also subjects the supplemental information (the decoded image-area separation signal in the present embodiment) to image processing suitable for an output destination specified by a user, and outputs the processed image data and information. The details thereof are explained later.

The HDD 5 is a large-sized storage unit that stores therein electronic data used also in a desktop PC, and mainly stores digital image data and supplemental information to the digital image data in the MFP 1000. Integrated drive electronics (IDE) is extended in the present embodiment to use a hard disk connected to the normalized ATA bus.

The CPU 6 is a microprocessing unit that controls the whole of the MFP 1000.

A memory 7 is a volatile memory that stores therein data to be temporarily exchanged so as to accommodate a difference in speeds when the bus standards are bridged and a difference in processing speeds of connected components, and that temporarily stores therein programs and intermediate process data when the CPU 6 controls the entire apparatus.

Because high-speed processing is demanded of the CPU 6, the system is booted by a boot program stored in a read only memory (ROM) 14 upon normal booting, and then, the CPU 6 performs processes using the program expanded in the memory 7 which is highly accessible. A double inline memory module (DIMM) used for a normalized PC is used in the present embodiment.

A plotter interface (I/F) unit 8 performs bus bridging such that digital image data including cyan, magenta, yellow, and black (CMYK) sent to the CPU 6 through an integrated general-purpose standard I/F is received and is output to a specific I/F of a plotter unit 9 as the image writing unit. The general-purpose standard I/F used in the present embodiment is the PCI-Express bus.

The plotter unit 9 receives the digital image data including the CMYK, and outputs the received image data to a recording medium through an electrophotographic process using a laser beam.

A south bridge (SB) 13 is a general-purpose electronic device, which is one of chipsets used in the PC. More specifically, the SB 13 is a general-purpose circuit formed with a bridging function of the bus often used for constructing a CPU system mainly including the PCI-Express and an industrial standard architecture (ISA) bridge. The SB 13 bridges between the ROM 14 and the other components in the present embodiment.

The ROM 14 is a memory that stores therein programs (including the boot program) used when the CPU 6 controls the entire MFP 1000.

An operation display unit 10 is an interface between the user and the MFP 1000. The operation display unit 10 includes a liquid-crystal display device (LCD) and key switches. The operation display unit 10 displays various statuses and an operating method of the MFP 1000 on the LCD and detects a key-switch entry from the user. The operation display unit 10 is connected to the CPU 6 through the PCI-Express bus in the present embodiment.

A line I/F unit 11 is a unit that connects between the PCI-Express bus and a telephone line. The MFP 1000 can exchange various data with external devices through the telephone line by using the unit.

A facsimile (FAX) 15 is an ordinary FAX connected to the line I/F unit 11 of the MFP 1000 through the telephone line, and transmits and receives image data to and from the MFP 1000. An external I/F unit 12 is a unit that connects between the PCI-Express bus and an external device such as a PC 16. The MFP 1000 can exchange various data with the external device by using the unit. A network (Ethernet) is used as a connection I/F to the unit in the present embodiment. In other words, the MFP 1000 is connected to the network through the external I/F unit 12.

The PC 16 is a personal computer, and the user inputs and outputs various controls and image data to and from the MFP 1000 through application software and driver installed in the PC.

The image data of which characteristics are uniform and the supplemental information such as the image-area separation signal are received from the first image-data processing unit 2 and the external I/F unit 12. All the received image data and supplemental information are encoded in the CPU 6 and stored in the HDD 5. When the stored data and information are to be processed in the second image-data processing unit 4 and subsequent stages, they are decoded and subjected to a conversion process.

The image data (RGB) with the uniform characteristics is processed at a high compression rate by using a Joint Photographic Experts Group (JPEG) coding which is irreversible. The supplemental information such as the image-area separation signal is processed by using a K8 encoding which is reversible. The respective processes allow minimization of degradation in image quality as low as possible.

When performing a copy operation, the user sets a document on the image reading unit 1, and sets a desired image quality mode or the like and enters an instruction to start copying in the operation display unit 10.

The operation display unit 10 converts the information entered by the user to the control command data for the apparatus, and issues the converted control command data. The issued control command data is notified to the CPU 6 through the PCI-Express bus.

The CPU 6 executes the program for a copying process according to the control command data for start of copying, and sequentially performs settings and operations required for the copying.

The operation processes are sequentially explained below. The image reading unit 1 scans the document to obtain each of 8-bit RGB digital image data. The first image-data processing unit 2 passes the 8-bit RGB digital image data through the scanner-correction processing unit 30, the γ converting unit 31, the filter processing unit 32, and the color converting unit 33 shown in FIG. 2 irrespective of the set image quality mode. And then, the 8-bit RGB digital image data are converted into RGB signals as uniform signals in which characteristics are previously defined such as sRGB and reference output medium metric (ROMM)-RGB, and the RGB signals are sent to the bus controller 3.

The separation decoding unit 36 decodes a 7-bit image-area separation signal generated in the image-area separating unit 35 of the first image-data processing unit 2 into information required for a subsequent process in the second image-data processing unit 4 according to the set image quality mode, and outputs the decoded information. For example, the 7-bit image-area separation signal output from the image-area separating unit 35 is as shown below.

CH2: character inside area (1)/non-character inside area (0)

CHR: character (1)/non-character (0)

HT: dense dots due to a large number of scan lines (1)/non-dense dots (0)

CW: chromatic (1)/non-chromatic <achromatic> (0)

WS: white background (1)/non-white background (0)

LHT: coarse dots due to a small number of scan lines (1)/non-coarse dots (0)

T: tracking pattern (1)/non-tracking pattern (0)

Such a 7-bit image-area separation signal as above is decoded into 2-bit attribute information (image-area separation signal) as shown below according to the set image quality mode.

Text document mode: black character, chromatic character, character inside area, and non-character Text-photograph mixture document mode: character/non-character, and chromatic/achromatic Photographic document mode: chromatic/achromatic, white background/non-white background Copied document mode: black character, chromatic character, white background, and non-character The bus controller 3 receives the uniform RGB image data from the first image-data processing unit 2 and the attribute information (image-area separation signal) having different attributes according to the set image quality mode, encodes the received RGB image data and attribute information through the CPU 6, and stores them in the memory 7 or the HDD 5.

The RGB image data and the attribute information for each pixel stored in the memory 7 or the HDD 5 are decoded in the CPU 6, and are sent to the second image-data processing unit 4 through the bus controller 3. The second image-data processing unit 4 converts the received RGB image data into CMYK image data to be output to the plotter based on the attribute information for each pixel, and outputs the converted CMYK image data.

The bus controller 3 receives the CMYK image data from the second image-data processing unit 4 and stores them in the memory 7 through the CPU 6. The stored CMYK image data are sent to the plotter unit 9 through the CPU 6 and a plotter I/F unit 8. The plotter unit 9 outputs the received CMYK image data to a recording medium, and thus a copy of the document is generated.

Figure 3:
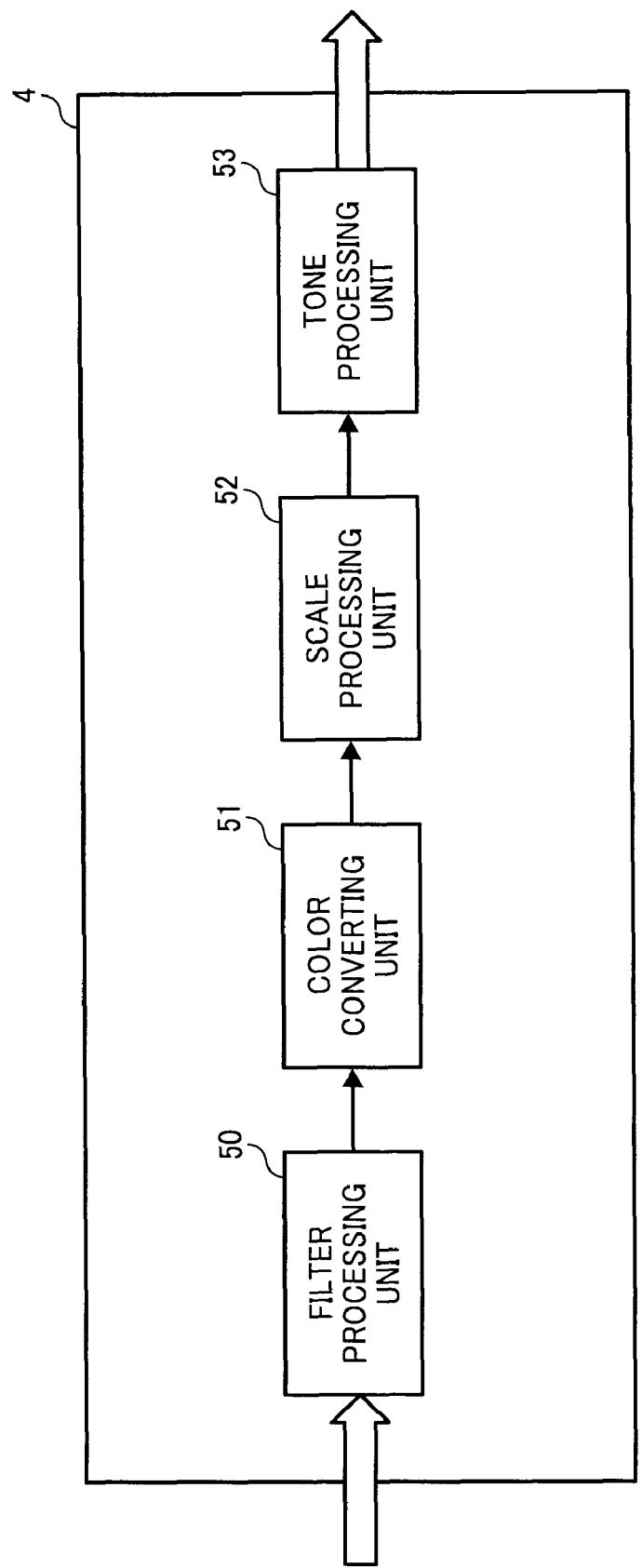
FIG. 3 is a schematic diagram of a processing block configuration of a second image-data processing unit.

FIG. 3 is a schematic diagram of a processing block configuration of the second image-data processing unit 4. The operation in this block is explained below.

A filter processing unit 50 corrects each sharpness of the uniform RGB image data so that the reproducibility upon output of the data to the plotter unit 9 is increased. More specifically, the uniform RGB image data are subjected to a sharpening/smoothing process according to the attribute information (image-area separation signal) decoded based on the set image quality mode. For example, in the text document mode, the image data is subjected to the sharpening process to make each character clear and sharp, while in the photographic mode, the image data is subjected to the smoothing process to express smooth gradation thereof.

A color converting unit 51 receives the 8-bit uniform RGB image data and converts them into 8-bit CMYK which is color space for the plotter. In this case also, the color converting unit 51 executes the most appropriate color control according to the attribute information (image-area separation signal) decoded based on the set image quality mode.

A scale processing unit 52 changes the size (resolution) of the CMYK image data to a size (resolution) according to reproducibility performance of the plotter unit 9. The performance of the plotter unit 9 according to the present embodiment is a 600-dpi output, and therefore the size is not particularly changed. A tone processing unit 53 receives each of the 8-bit CMYK and converts each 8 bits to the number of tones according to tone processing capability of the plotter unit 9. In the present embodiment, each 8 bits is converted to each of 2-bit CMYK by using an error diffusion method which is one of pseudo-halftone processing.

When performing a fax transmission, the user sets a document on the image reading unit 1, and sets a desired image quality mode or the like and enters an instruction to start fax transmission in the operation display unit 10. The operation display unit 10 converts the information entered by the user to the control command data for the apparatus, and issues the converted control command data. The issued control command data is notified to the CPU 6 through the PCI-Express bus. The CPU 6 executes the program for a fax-transmission process according to the control command data for start of fax transmission, and sequentially performs settings and operations required for the fax transmission. The operation processes are sequentially explained below.

The image reading unit 1 scans the document to obtain each of 8-bit digital RGB image data. The first image-data processing unit 2 converts the 8-bit RGB digital image data to RGB values which have preset uniform characteristics, and sends the RGB values to the bus controller 3.

The bus controller 3 receives the RGB image data from the first image-data processing unit 2, and stores them in the memory 7 through the CPU 6. The uniform RGB image data stored in the memory 7 are sent to the second image-data processing unit 4 through the CPU 6 and the bus controller 3.

The second image-data processing unit 4 converts the received uniform RGB image data into monochrome binary image data for fax transmission, and outputs the converted image data. The bus controller 3 receives the monochrome binary image data from the second image-data processing unit 4 and stores them in the memory 7 through the CPU 6.

The stored monochrome binary image data are sent to the line I/F unit 11 through the CPU 6. The line I/F unit 11 transmits the received monochrome binary image data to the FAX 15 connected thereto through a line.

When performing a scanner delivery operation, the user sets a document on the image reading unit 1, and sets a desired mode or the like and enters an instruction to start scanner delivery in the operation display unit 10. The operation display unit 10 converts the information entered by the user to the control command data for the apparatus, and issues the converted control command data. The issued control command data is notified to the CPU 6 through the PCI-Express bus. The CPU 6 executes the program for a scanner delivery process according to the control command data for start of scanner delivery. The scanner sequentially performs settings and operations required for the delivery operation. The operation processes are sequentially explained below.

The image reading unit 1 scans the document to obtain each of 8-bit RGB digital image data. The first image-data processing unit 2 converts the 8-bit RGB digital image data to RGB values which have preset uniform characteristics, and sends the RGB values to the bus controller 3.

The bus controller 3 receives the uniform RGB image data from the first image-data processing unit 2, and stores the RGB image data in the memory 7 through the CPU 6. The RGB image data stored in the memory 7 are sent to the second image-data processing unit 4 through the CPU 6 and the bus controller 3. The second image-data processing unit 4 converts the received RGB image data into image data for scanner delivery such as sRGB, and outputs the converted image data. The bus controller 3 receives the image data such as RGB multi-value, grayscale, and a monochrome binary value from the second image-data processing unit 4, and stores them in the memory 7 through the CPU 6. The stored image data are sent to the external I/F unit 12 through the CPU 6. The external I/F unit 12 transmits the received image data to the PC 16 connected thereto via the network.

The operations when the image data obtained by scanning the document are stored in the MFP 1000 and then the stored image data are reused in the present embodiment are explained below.

The user sets a document on the image reading unit 1, and sets a desired image quality mode or the like and enters an instruction to start copying in the operation display unit 10. The operation display unit 10 converts the information entered by the user to the control command data for the apparatus, and issues the converted control command data. The issued control command data is notified to the CPU 6 through the PCI-Express bus. The CPU 6 executes the program for a copying process according to the control command data for start of copying, and sequentially performs settings and operations required for the copying.

The image reading unit 1 scans the document to obtain each of 8-bit RGB digital image data. The first image-data processing unit 2 passes the 8-bit RGB digital image data through the scanner-correction processing unit 30, the γ converting unit 31, the filter processing unit 32, and the color converting unit 33 irrespective of the set image quality mode. During the passage, the 8-bit RGB digital image data are made uniform so as to be RGB signals in which characteristics are previously defined such as sRGB and ROMM-RGB, and the RGB signals are sent to the bus controller 3.

The scanner-correction processing unit 30 corrects shading or uneven reading of the digital image data received from the image reading unit 1 shown in FIG. 1 which may occur caused by the mechanism of the image reading unit 1 (scanner) such as uneven illumination. The γ converting unit 31 converts γ characteristics of the RGB image data received from the image reading unit 1 to preset characteristics (e.g. ½, square).

The filter processing unit 32 unifies each sharpness of the RGB image data to preset characteristics. For example, when a reference chart is scanned, the filter processing unit 32 converts scan lines per inch to a preset MTF characteristic value for each set image quality mode. At this time, the process is performed by using parameters based on the image-area separation signal generated in the image-area separating unit 35.

The color converting unit 33 converts the RGB image data to RGB image data values with the preset characteristics such as sRGB and opRGB. A scale processing unit 34 unifies each size (resolution) of the RGB image data to the preset characteristics.

The size (resolution) is converted to 600 dpi in the present embodiment. The separation decoding unit 36 decodes the 7-bit image-area separation signal generated in the image-area separating unit 35 of the first image-data processing unit 2 into information required for a subsequent process in the second image-data processing unit 4 according to the set image quality mode, and outputs the decoded information. For example, the 7-bit image-area separation signal output from the image-area separating unit 35 is as shown below.

CH2: character inside area (1)/non-character inside area (0)
CHR: character (1)/non-character (0)
HT: dense dots due to a large number of scan lines (1)/non-dense dots (0)
CW: chromatic (1)/non-chromatic <achromatic> (0)
WS: white background (1)/non-white background (0)
LHT: coarse dots due to a small number of scan lines (1)/non-coarse dots (0)
T: tracking pattern (1)/non-tracking pattern (0)

The separation decoding unit 36 decodes the 7-bit image-area separation signal into 2-bit attribute information (image-area separation signal) as shown below according to the set image quality mode.

Text document mode: black character, chromatic character, character inside area, and non-character
Text-photograph mixture document mode: character/non-character, and chromatic/achromatic
Photographic document mode: chromatic/achromatic, and white background/non-white background
Copied document mode: black character, chromatic character, white background, and non-character The bus controller 3 receives the uniform RGB image data from the first image-data processing unit 2 and the attribute information (image-area separation signal) having different attributes according to the set image quality mode, encodes the received RGB image data and attribute information through the CPU 6, and stores them in the memory 7. The stored uniform RGB image data are transferred to the HDD 5 through the CPU 6 and the bus controller 3, and are stored together with image input conditions (in this case, scanner input and image quality mode) in the HDD 5. Thereafter, the second image-data processing unit 4 interprets the uniform RGB image data in the memory 7 as the image scanned by the scanner and the image quality mode set upon entry, converts the image data into an output signal suitable for the plotter unit 9, and outputs the output signal, and thus a copy of the document is generated.

By referring to the processing block configuration of the second image-data processing unit 4 as shown in FIG. 3, the operations in this block are explained below.

The filter processing unit 50 corrects each sharpness of the uniform RGB image data so that the reproducibility upon output of the image data to the plotter unit 9 is increased. More specifically, the uniform RGB image data are subjected to the sharpening/smoothing process according to the attribute information (image-area separation signal) decoded based on the set image quality mode. For example, in the text document mode, the image data is subjected to the sharpening process to make each character clear and sharp, while in the photographic mode, the image data is subjected to the smoothing process to express smooth gradation thereof.

The color converting unit 51 receives each of the 8-bit uniform RGB image data and converts the received image data into each of 8-bit CMYK which is color space for the plotter. In this case, the color converting unit 51 executes the most appropriate color control to the image data according to the attribute information (image-area separation signal) decoded based on the set image quality mode. The scale processing unit 52 changes the size (resolution) of the CMYK image data to a size (resolution) according to reproducibility performance of the plotter unit 9. The performance of the plotter unit 9 according to the present embodiment is a 600-dpi output, and therefore the size is not particularly changed. The tone processing unit 53 receives each of the 8-bit CMYK and converts each 8 bits to the number of tones according to tone processing capability of the plotter unit 9.

As another operation upon storage of the image, the CPU 6 may also detect each usage rate of the memory 7 and the HDD 5, encode the decoded attribute information after being changed, and store the encoded attribute information.

For example, when the image is input when the usage rate of the HDD 5 exceeds a specified value, the CPU 6 discards part of the attribute information (image-area separation signal) received from the separation decoding unit 36 in such a manner that 0 is set to all lower bits of entire pixels, and encodes the attribute information to be stored therein. When the CPU 6 operates under the condition, the attribute information is interpreted as, for example, attribute information (image-area separation signal) as shown below according to the set image quality mode.

Text document mode: black character/non-black character

Text-photograph mixture document mode: black character/non-black character

Photographic document mode: white background/non-white background

Copied document mode: black character/non-black character

When performing a data printing operation and data storing operation in an HDD, the user operates application software of desk top publishing (DTP) on the PC 16, creates and edits text and graphics, and sets a desired printer output mode or the like and instructs to start printing. The PC 16 converts the created and edited text and graphics to information such as command and data described in a page description language (PDL), translates the PDL data, performs raster image process (RIP) on the image data so as to be converted to raster image data, and sends the raster image data to the CPU 6 through the external I/F unit 12.

According to the present embodiment, when the raster image process (RIP) is performed, the PC 16 converts the image data to the uniform RGB image data having the preset characteristic, and simultaneously generates 4-bit attribute information as shown below.

CHR: character and line drawing (1)/non-character and line drawing (0)

CW: chromatic (1)/non-chromatic <achromatic> (0)

WS: white background (1)/non-white background (0)

HS: saturated color (1)/non-saturated color (0)

The attribute information is decoded to 2-bit attribute information as shown below according to a further set printer output mode, and sends the decoded attribute information to the CPU 6 through the external I/F unit 12.

Ordinary text output: achromatic color in a portion other than an image, chromatic color in the portion other than the image, image, and white background Graphic output: achromatic color, chromatic color, white background, and saturated color Photographic image output: white background/non-white background The CPU 6 receives the uniform RGB image data from the first image-data processing unit 2 and the attribute information having different attributes according to a set image out mode, encodes the received RGB image data and attribute information through the CPU 6, and stores them in the memory 7.

The uniform RGB image data stored in the memory 7 are sent to the HDD 5 through the CPU 6 and the bus controller 3, and stored in the HDD 5 together with image input conditions (in this case, printer output and image output modes, etc.).

Thereafter, the second image-data processing unit 4 interprets the uniform RGB image data in the memory 7 as the printer output image and the image output mode set upon entry, converts the image data into an output signal suitable for the plotter unit 9, and outputs the output signal, and thus a printer output image is generated.

The color converting unit 51 receives each of the 8-bit uniform RGB image data and converts the received image data into each of 8-bit CMYK which is color space for the plotter unit 9. In this case, the color converting unit 51 executes the most appropriate color control to the image data according to the attribute information decoded based on set image quality mode information.

The scale processing unit 52 changes the size (resolution) of the CMYK image data to a size (resolution) according to reproducibility performance of the plotter unit 9. The performance of the plotter unit 9 according to the present embodiment is a 600-dpi output, and therefore the size is not particularly changed. The tone processing unit 53 receives each of the 8-bit CMYK and converts each 8 bits to the number of tones which is the most appropriate for the tone processing capability of the plotter unit 9 and the attribute information decoded according to the set image quality mode information.

As another operation upon storage of the image, the CPU 6 may also detect each usage rate of the memory 7 and the HDD 5, encode the decoded attribute information after being changed, and store the encoded attribute information.

The operations of reusing the image data stored in the HDD 5 are explained below.

The user uses the operation display unit 10 to set a desired mode or the like and enter an instruction to start fax transmission for the image data which is stored in the HDD 5 when the latest copying is operated. The operation display unit 10 converts the information entered by the user to the control command data for the apparatus and issues the converted control command data. The issued control command data is notified to the CPU 6 through the PCI-Express bus. The CPU 6 executes the program for a fax transmission process according to the control command data for start of fax transmission, and sequentially performs settings and operations required for the fax transmission.

The bus controller 3 outputs the RGB image data stored in the HDD 5 to the memory 7 through the CPU. Thereafter, as explained above, the RGB image data in the memory 7 are output to the line I/F unit 11 through the second image-data processing unit 4, and thus fax transmission is performed.

By referring to the processing block configuration of the second image-data processing unit 4 as shown in FIG. 3, the operations in this block are sequentially explained below.

The filter processing unit 50 corrects each sharpness of the RGB image data so that the reproducibility upon transmission of the image data by FAX is increased. More specifically, the RGB image data are subjected to the sharpening/smoothing process according to desired mode information. For example, in the text mode, the image data is subjected to the sharpening process to make each character clear and sharp, while in the photographic mode, the image data is subjected to the smoothing process to express smooth gradation thereof. The color converting unit 51 receives each of the 8-bit RGB image data and converts the received image data into 8-bit monochrome which is an ordinary single color used in the FAX.

The scale processing unit 52 changes the size (resolution) of the monochrome image data to a size (resolution) with which the image data is transmitted and received by the FAX. In the present embodiment, the size is changed to a size of horizontal: 200 dpi×vertical: 100 dpi. The tone processing unit 53 receives the 8-bit monochrome and converts the 8-bit monochrome to the number of tones according to tone processing capability when the image data is transmitted and received by the FAX. In the present embodiment, the number of tones of the 8-bit monochrome is converted to a binary value by using the error diffusion method which is one of the pseudo-halftone processing.

The user uses the operation display unit 10 to set a desired mode or the like and enter an instruction to start scanner delivery for the image data which is stored in the HDD 5 when the latest copying is operated. The operation display unit 10 converts the information entered by the user to the control command data for the apparatus, and issues the converted control command data. The issued control command data is notified to the CPU 6 through the PCI-Express bus. The CPU 6 executes the program for a scanner-delivery process according to the control command data for start of scanner delivery, and sequentially performs settings and operations required for the scanner delivery operation.

The bus controller 3 outputs the RGB image data stored in the HDD 5 to the memory 7 through the CPU 6. Thereafter, as explained above, the RGB image data in the memory 7 are output to the external I/F unit 12 through the second image-data processing unit 4, and thus scanner delivery is performed.

By referring to the processing block configuration of the second image-data processing unit 4 as shown in FIG. 3, the operations in this block are sequentially explained below.

The filter processing unit 50 corrects each sharpness of the RGB image data so that the reproducibility upon scanner delivery is increased. More specifically, the RGB image data are subjected to the sharpening/smoothing process according to desired mode information. For example, in the text mode, the image data is subjected to the sharpening process to make each character clear and sharp, while in the photographic mode, the image data is subjected to the smoothing process to express smooth gradation thereof. The color converting unit 51 receives each of the 8-bit RGB image data and converts the received image data into specified color space. In the present embodiment, the image data is converted into an sRGB color space which is ordinary for scanner delivery, by each of 8-bit colors.

The scale processing unit 52 changes the size (resolution) of the sRGB image data to a size (resolution) with which the image data is transmitted and received upon specified scanner delivery. In the present embodiment, the size is changed to a size of horizontal: 200 dpi×vertical: 200 dpi. The tone processing unit 53 converts the image data to the number of tones according to the tone processing capability when the image data is transmitted and received upon specified scanner delivery. In the present embodiment, the tone processing is not particularly performed because 160,000 colors of the 8-bit RGB are assumed to be specified.

Therefore, when the user desires an output destination of the data stored in the MFP 1000, which is different from the output destination upon input, the output destination can be changed without any change in the image quality from the ordinary operation (the operation when the output destination is initially specified), which allows significant improvement of reusability.

The color converting unit 51 subjects the stored uniform RGB image data to color matching for RGB-CMYK (plotter output signal) and RGB-sRGB (delivery signal) and to color conversion according to the attribute information generated for each pixel. The color converting unit 51 also adaptively generates ink according to a feature amount extracted by a post filter module, and performs an effective process by under color removal (UCR) and under color addition (UCA) suitable for picture and text by using the image-area separation signal. Background removal processing and under color processing are performed if necessary.

Figure 4:
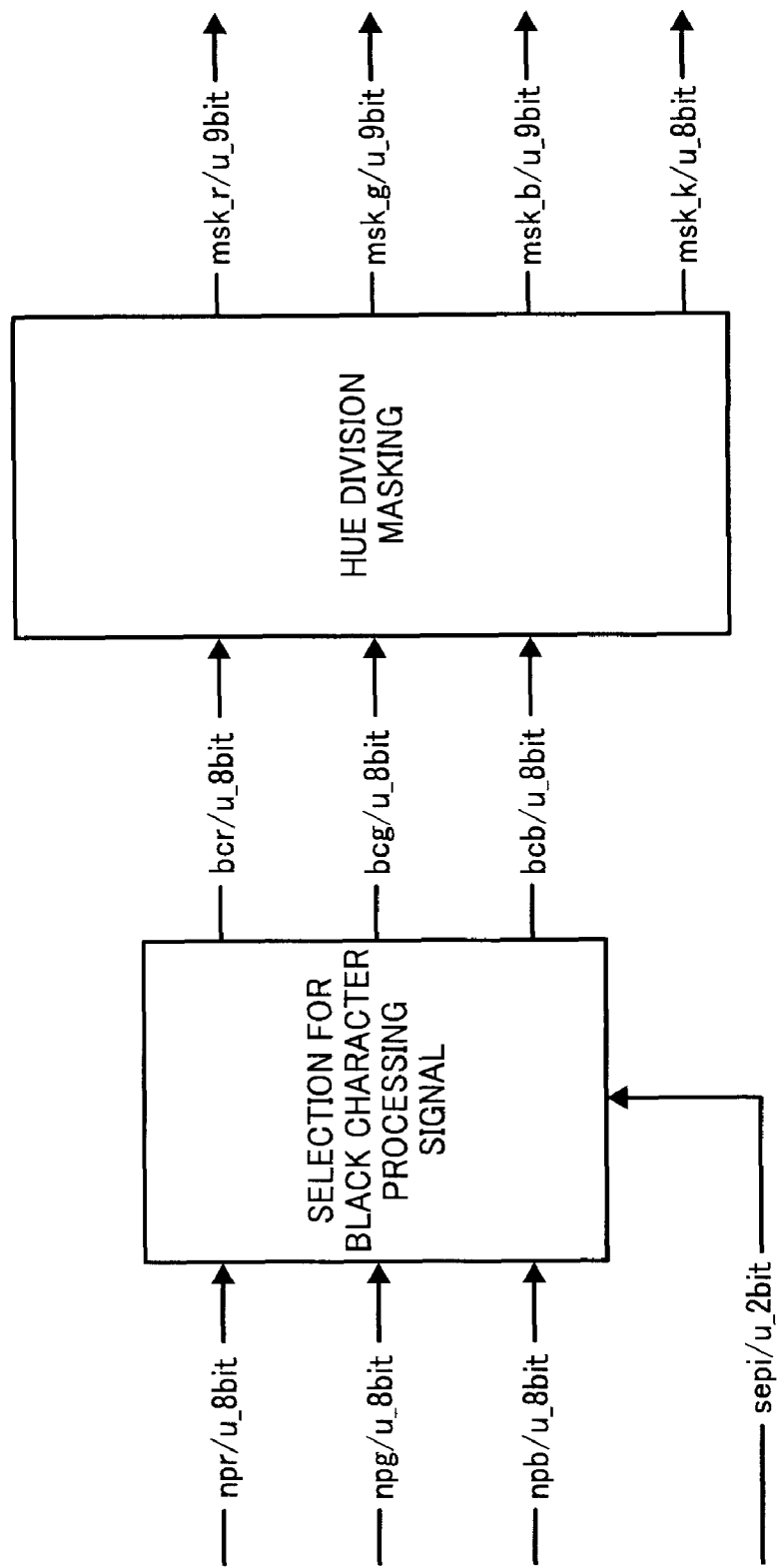
FIG. 4 is a schematic diagram of a masking conversion block for color correction at a previous stage.
Figure 5:
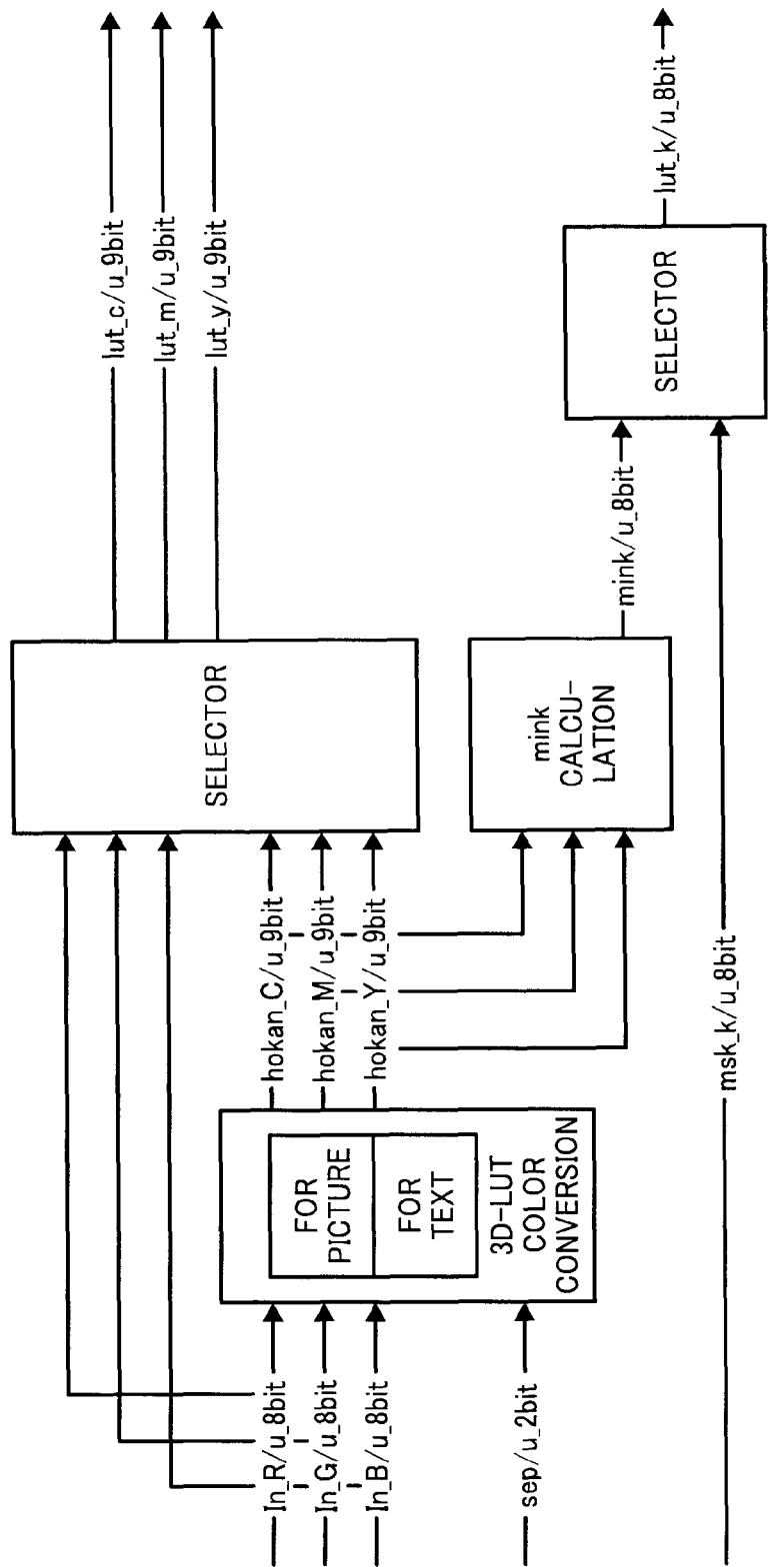
FIG. 5 is a schematic diagram of a three-dimensional lookup table (3D-LUT) conversion block for color correction at a subsequent stage.

The color conversion in the color converting unit 51 according to the present invention includes a masking color conversion block for color correction at the previous stage as shown in FIG. 4. The color conversion also includes a 3D-LUT conversion block for color correction at the subsequent stage, a gray component replacement (GCR) processing block, a UCR processing block, and a UCA processing block as shown in FIG. 5.

The RGB signals for black character processing are select at an input stage, and a masking operation for RGB→RGB is performed. The masking color conversion block is a conversion block where coloring is mainly performed. In this conversion block, to perform the black character processing used when the attribute information (image-area separation signal) is an achromatic character (=black character), the RGB signals used for the masking are selected by using parameters of "bc" and "ming". When the separation signal indicates an achromatic character and the black character processing is effective (parameter bc=1), the RGB data are output collectively.

At this time, if the parameter ming is 1, minimum values of input RGB data (npr, npg, npb:u_8 bit) are output, while if the parameter ming is 0, the input G data is output as RGB data (bcr, bcg, bcb:u_8 bit). If the parameter is any value other than these, then the input RGB data (npr, npg, npb:u_8 bit) are output as they are. When the attribute information (image-area separation signal) indicates the white background, white (before reversed: R=G=B=255) is forcibly output regardless of the input RGB data values. The process is discretely performed on each color of RGBK in a block where a product-sum operation for linear masking is performed. A color correction coefficient and a color correction constant are selected and calculated based on the set image quality mode and the attribute information (image-area separation signal). Each of the coefficient and the constant is s_12 bit, a setting range is from −2048 to 2047, and two's complement is set. In the following equation, 128 is an extra figure provided for rounding.

Sum_$X$=coef_$r$[hue]*$bcr$+coef_$g$[hue]*$bcg$+coef_$b$[hue]*$bcb$+const*256+128($X$: RGBK)

Msk_$X$=sum_$X$>>8($X$: RGBK)

Lower 8 bits as a result of the product-sum operation for the linear masking of each color are rounded down (divided by 256) to obtain Msk_R, Msk_G, Msk_B, and Msk_K, and each range of these is limited as follows and output.

| | |
|---|---|
| RGB | 9 bits (0 to 511) |
| K | 8 bits (0 to 255) |

It is noted that the masking processing is performed by using parameter tsmthm, so that an output can be switched.

The color conversion is executed by using the 3D-LUT in the 3D-LUT conversion block. A widely used memory-map interpolation method is used for a conversion algorism. This block also has a function of normalizing an output of memory-map interpolation and a function of outputting minimum values of CMY as K. The 3D-LUT includes a picture area and a text area, and these areas can be switched by the attribute information (image-area separation signal).

Input u_8 bit image data (In_R, In_G, In_B) are obtained by subjecting u-8bit to 3D memory-map interpolation.

The memory-map interpolation method is implemented by dividing a 3D input color space into a plurality of unit cubes, further dividing each of the divided unit cubes into six tetrahedrons which share their symmetrical axes, and calculating an output value for each unit cube through a linear operation.

Data at a point (grid point) of division boundary is used as a parameter for the linear operation.

An actual procedure thereof is as follows (the same process is executed for each output plane). It is noted that the 3D memory-map interpolation uses eight divisions (length of one side of a unit cube).

If the input data is X(x, y, z), a unit cube including the coordinate X is first selected. Here, lower coordinates (Δx, Δy, Δz) of a coordinate P in the unit cube selected so as to be X(x, y, z)=(In_R, In_G, In_B) are calculated. A unit tetrahedron is selected through a comparison of a magnitude relation between the lower coordinates, linear interpolation is executed for each unit tetrahedron, to calculate an output value Pout at the coordinate P. The output value Pout is set to be an integer by multiplying the whole equations by a length of one side of the unit cube.

As shown in FIG. 6, P0 to P7 are output values at grid points, and interpolation coefficients $K_0$, $K_1$, $K_2$, and $K_3$ are determined according to each magnitude relation between Δx, Δy, and Δz, and to the separation signals.

Figure 7:
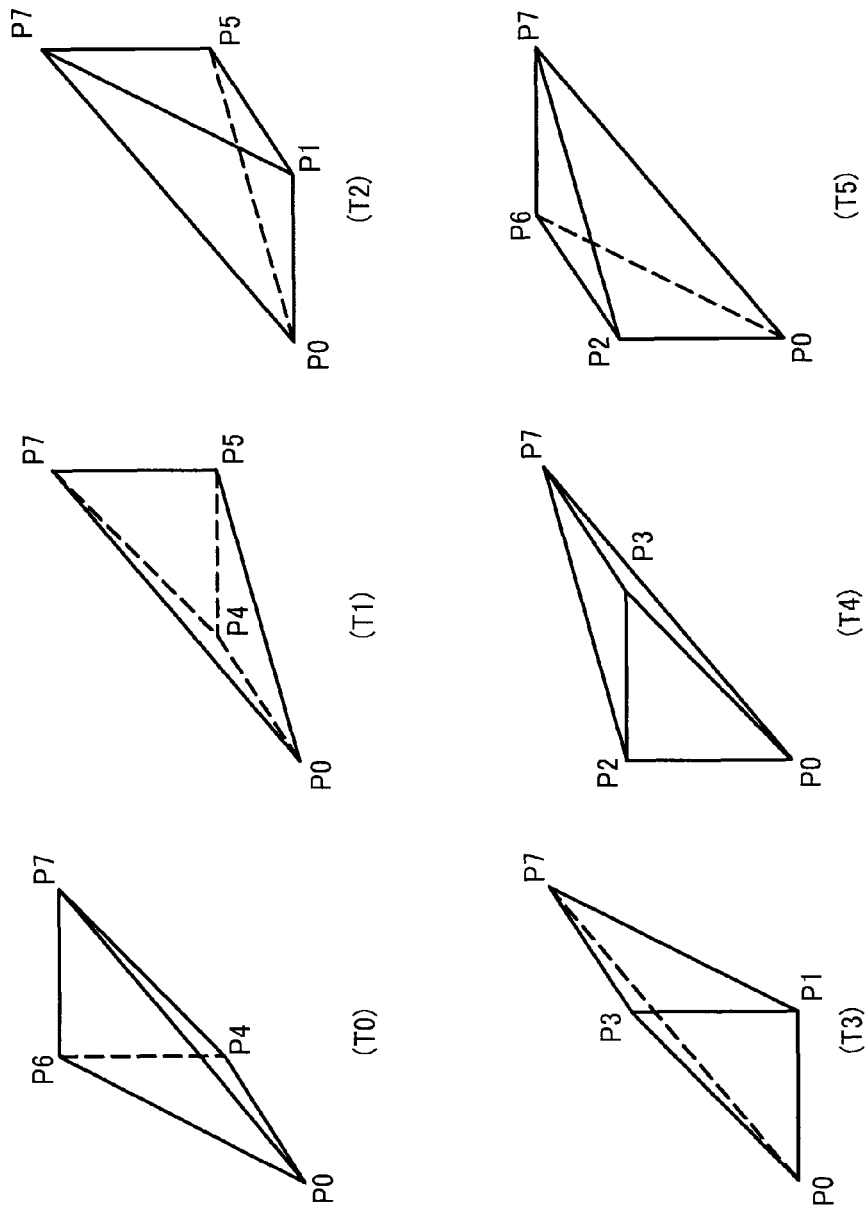
FIG. 7 is a schematic diagram of interpolation tetrahedrons each of which is defined by grid points used for interpolation.

FIG. 7 is a schematic diagram of interpolation tetrahedrons each of which is defined by grid points used for interpolation. FIG. 8 is a table of determination rules for interpolation coefficients common among individual separation signals. Finally, the linear interpolation is executed by using the following equations each based on output values on preset vertexes of four points of a selected tetrahedron and a location in an input tetrahedron (a distance from each vertex).

$$pout\_c = K_0\_Cx\Delta x + K_1\_Cx\Delta y + K_2\_Cx\Delta z + K_3\_C << 5$$

$$pout\_m = K_0\_Mx\Delta x + K_1\_Mx\Delta y + K_2\_Mx\Delta z + K_3\_M << 5$$

$$pout\_y = K_0\_Yx\Delta x + K_1\_Yx\Delta y + K_2\_Yx\Delta z + K_3\_Y << 5$$

Figure 9:
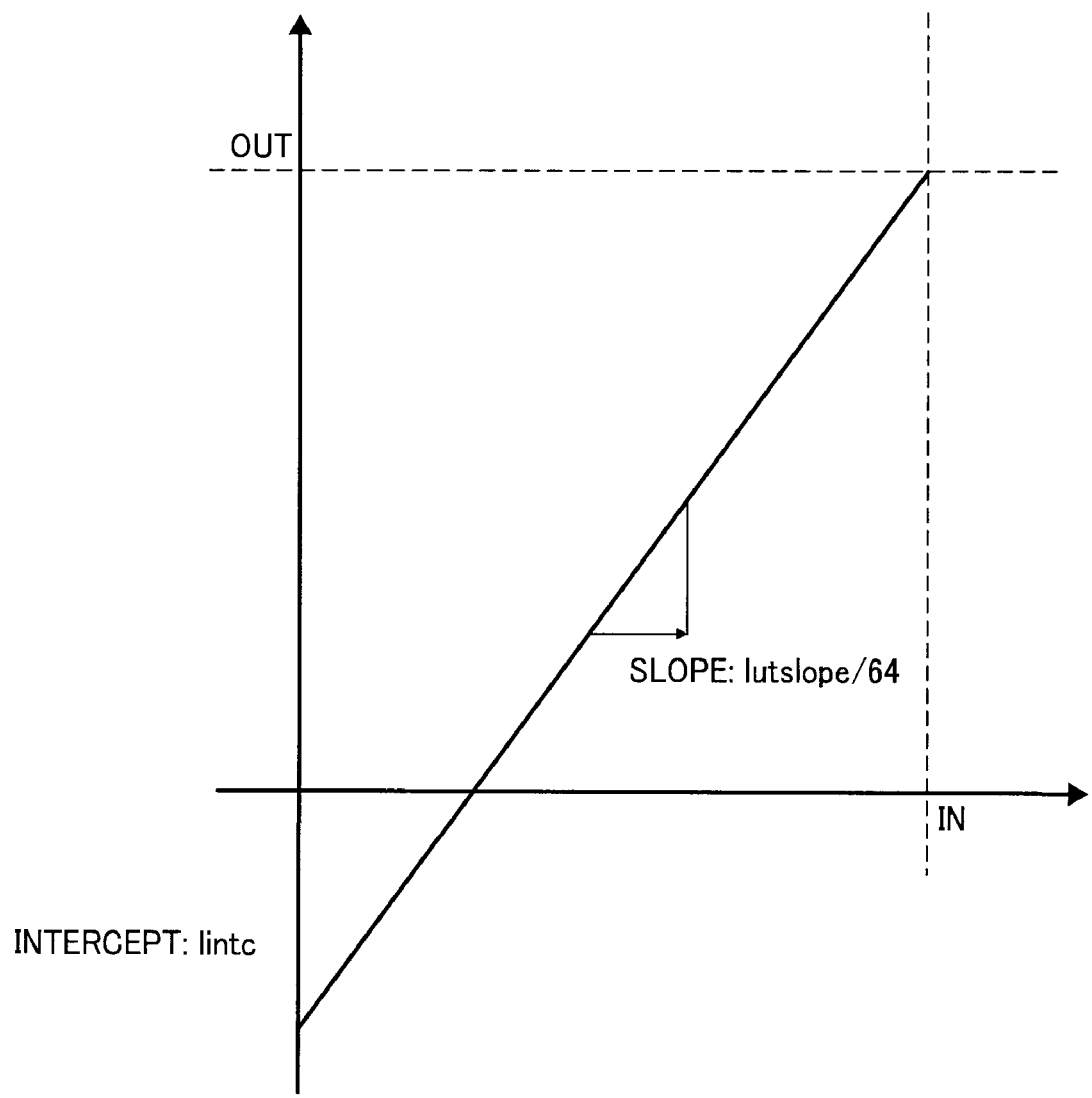
FIG. 9 is a graph for explaining linear normalization using "slope" and "intercept" with respect to a calculated output of the 3D-LUT.

Linear normalization is performed on each calculated output of the 3D-LUT by using each slope and intercept expressed by the following equations (see FIG. 9). It is noted that if the data after the normalization is negative, then it is clipped at zero.

$$hokan\_c = (pout\_c * lutslope) >> 12 - lintc$$

$$hokan\_m = (pout\_m * lutslope) >> 12 - lintc$$

$$hokan\_y = (pout\_y * lutslope) >> 12 - lintc$$

A range to be expanded can also be changed for each output plane of the 3D-LUT conversion, and in this case, the slope and the intercept are set for each output plane as shown below. By thus setting, even if an expanded RGB space with a wide color reproduction area is largely different from the shape of a color reproduction area (gamut) of a color-image output unit, the colors can be highly precisely converted to colors of the color-image output unit without an increase in the scale of a color conversion table.

$$hokan\_c = (pout\_c * lutslope\_C) >> 12 - lintc\_C$$

$$hokan\_m = (pout\_m * lutslope\_M) >> 12 - lintc\_M$$

$$hokan\_y = (pout\_y * lutslope\_Y) >> 12 - lintc\_Y$$

Each minimum value (mink) of CMY used for ink generation (GCR) at the subsequent stage is calculated. A value which is the minimum is calculated from u_9 bit CMY output after the CMY are subjected to the 3D-LUT conversion, and data equal to or higher than 256 is clipped at 255 (u_8 bit).

$$mink = min(hokan\_c, hokan\_m, hokan\_y)$$

The ink generation (GCR) is discretely performed on respective picture area and text area. In the picture area of the areas, the ink generation can be performed adaptively to an edge amount of GCR detected by a post filter.

If the detected edge amount in a picture portion is small, the parameter is set to a small amount of ink for picture (parameters gslopep, gintp), and if the edge amount therein is larger, the parameter is set to be closer to a large amount of ink for text. If the edge amount becomes a maximum value, then 100% of ink is generated, which is the same amount as that of a text portion. The text portion is not adaptive to the edge amount but is a fixed value using the parameters gslopec, gintc. Further, the ink (K plane) is generated according to a "mink" signal output from the 3D-LUT.

$$adpk = ((gslopep * mink) >> 13) - gintp$$

$$fixk = ((gslopec * mink) >> 13) - gintc$$

However, both "adpk" and "fixk" are clipped at [0 to 255].

Either one of the two types of inks adpk and fixk generated in the above manner is selected as a final ink gcr_bk based on a parameter gcr_mode and the attribute information (image-area separation signal). The ink gcr_bk is used to calculate an amount of ink for UCR to be used for UCR as shown below.

$$adpucrk = ((uslopep * gcr\_bk) >> 13) - uintp$$

$$fixucrk = ((uslopec * gcr\_bk) >> 13) - uintc$$

However, both "adpucrk" and "fixucrk" are clipped at [0 to 255]. Either one of the two types of inks for UCR adpucrk and fixucrk generated in the above manner is selected as a final ink ucr_bk for UCR based on the parameter gcr_mode and the separation signals.

The UCR Processing Block is a block where the UCR process is performed according to the amount of ink generated through the GCR process and CMY signals are corrected. The UCR process includes an "excess" correction process of preventing dots from being collapsed due to high density caused by a change of a density notch. ON/OFF can be set for each of the text area and the picture area as shown below.

Excess correction process: ON
When lut_X>255, $$lut\_X' = 256 + (lut\_X \& 0x00ff) >> 1 \, (X: cmy)$$

When any case other than the above case, $$lut\_X' = lut\_X (cmy)$$

Excess correction process: OFF
When lut_X>255, $$lut\_X' = 255 \, (X: cmy)$$

When any case other than the above case, $$lut\_X' = lut\_X (X: cmy)$$

The previously calculated ink ucr_bk for UCR is subtracted from an image signal lut_c'·lut_m'·lut_y' in which the excess is corrected in the above manner.

$$ucr\_X = lut\_X - ucr\_bk (X: cmy)$$

However, ucr_X is clipped at [0 to 255].

In the UCR processing block, the ucr_c/ ucr_m/ ucr_y or an output lut_c'/ lut_m'/ lut_y' after the excess is corrected is switched by using a parameter ucr_mode, to be output to a next UCA process.

The UCA Processing Block is a block where the UCA process is performed on the CMY signals after being subjected to the UCR process. If the subtraction is performed using the equation as it is in the UCR process, a portion is subtracted too much. Therefore, the portion which is subtracted too much in the UCR is corrected according to the amount of ink generated in the GCR process. In the UCA process, ON/OFF can be set for each of the text area and the picture area by using a parameter uca_mode.

$$uca\_X = (ucr\_X \times (256 + ucr\_bk))/256 (X: cmy)$$

However, uca_X is clipped at [0 to 255].

Although the exemplary embodiments to implement the present invention are explained above, the present invention is not limited by these embodiments. Thus it is obvious that various modifications are possible without departing from the spirit and scope of the present invention.

As described above, according to an aspect of the present invention, the image data input from the image reading unit and stored in the storing unit becomes reusable in the image writing unit and the external device. Therefore, it is possible to provide the image processing apparatus capable of minimizing the increase in costs as low as possible and converting the image data into an output image with less degradation in image quality.

Furthermore, according to another aspect of the present invention, it is possible to provide the image processing apparatus capable of minimizing the increase in costs as low as possible and converting the image, in which character of line drawing and halftone photograph are mixed, into an output image with less degradation in image quality.

Moreover, according to still another aspect of the present invention, it is possible to provide the image processing apparatus capable of minimizing the increase in costs as low as possible and converting the image data into an output image with image quality required by the user, in the digital color MFP including the various color-image input/output units.

Furthermore, according to still another aspect of the present invention, it is possible to provide the image processing apparatus capable of minimizing the increase in costs as low as possible and converting the image data into an output image with less degradation in image quality, the degradation easily occurring depending on input conditions.

Moreover, according to still another aspect of the present invention, it is possible to provide the image processing apparatus capable of minimizing the increase in costs as low as possible and converting the image data into an output image with less degradation in image quality, the degradation easily occurring depending on an image type described in the page description language.

Furthermore, according to still another aspect of the present invention, it is possible to provide the image processing apparatus capable of converting the image data into an output image with less degradation in image quality by effectively using resources according to the memory usage by the user.

Moreover, according to still another aspect of the present invention, it is possible to provide the image processing apparatus capable of converting the input image to an output image with less degradation in image quality which is important to users, by effectively using the resources.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an image reading unit that reads a document to obtain electronic image data;
an image writing unit that prints an image on a recording medium,
wherein the image writing unit has a writing unit reproducibility capability and a writing unit tone-processing capability;
a storing unit that stores therein the image data and supplemental information of the image data;
an external interface unit that exchanges the image data and the supplemental information with an external device having an external device reproducibility capability and an external device tone-processing capability;
a first image-data processing unit that processes first image data input from the image reading unit; and
a second image-data processing unit that processes received image data for supply to a target destination, by converting resolution and number of tones of the received image data to another resolution and number of tones, according to target reproducibility capability and target tone-processing capability of the destination, wherein
the first image-data processing unit processes the first image data into unified image data having pre-defined characteristics that render the unified image data usable in each of the image writing unit and the external device, converts the supplemental information to converted supplemental information, in accordance with an image quality mode set when the document is read by the image reading unit, and stores the unified image data with the converted supplemental information in the storing unit, and wherein
in a case that the second image-data processing unit is converting target image data for outputting to the image writing unit, the second image-data processing unit converts the target image data of a specific resolution and specific number of tones into converted image data of converted data resolution and converted number of tones, according to the writing unit reproducibility capability and the writing unit tone-processing capability, respectively, of the image writing unit, and
in a case that the second image-data processing unit is converting the target image data for outputting to the external device, the second image-data processing unit converts the target image data of the specific resolution and the specific number of tones into output image data of output data resolution and output number of tones, according to the external device reproducibility capability and the external device tone-processing capability, respectively, of the external device.

2. The image processing apparatus according to claim 1, wherein the supplemental information includes at least image-area separation information for each pixel of corresponding image data, and the first image-data processing unit changes the attribute of the supplemental information according to the image input condition.

3. The image processing apparatus according to claim 1, wherein the image input condition includes at least an image output mode set at a time of inputting an image, and the first image-data processing unit changes the attribute of the supplemental information according to the image output mode.

4. The image processing apparatus according to claim 1, wherein the image input condition includes at least a type of input image data, and the first image-data processing unit changes the attribute of the supplemental information according to the type of the input image data.

5. The image processing apparatus according to claim 4, wherein the type of the input image data includes at least an image described in a page description language, and the first image-data processing unit changes the attribute of the supplemental information for each page of the input image data according to a described image type.

6. The image processing apparatus according to claim 5, wherein a priority of attribute information is set for each image input condition, and the first image-data processing unit changes the attribute of the supplemental information based on the priority of attribute information set for each image input condition.

7. The image processing apparatus according to claim 1, wherein the image input condition includes at least a usage status of the storing unit, and the first image-data processing unit changes the attribute of the supplemental information according to a memory usage rate of the storing unit.

8. The image processing apparatus according to claim 7, wherein a priority of attribute information is set for each image input condition, and the first image-data processing unit changes the attribute of the supplemental information based on the priority of attribute information set for each image input condition.

9. The image processing apparatus according to claim 1, wherein the unified image data having the pre-defined characteristics includes sRGB and ROMM-RGB.

10. The image processing apparatus according to claim 1, wherein the supplemental information indicates a first number of attributes of the image data obtained by reading the document, and the converted supplemental information indicates a second number of attributes of the unified image data, and wherein the first number of attributes of the image data is different from the second number of attributes of the unified image data.

11. A multi-function apparatus comprising:

an image reading unit that reads a document to obtain electronic image data;

a plotter unit that prints an image, based on the image data, on a recording medium, wherein the plotter unit has a plotter unit reproducibility capability and a plotter unit tone-processing capability;

a storing unit that stores therein the image data and supplemental information in a first format indicating plural attributes of the image data;

an external interface unit that exchanges the image data and the supplemental information with an external device having an external device reproducibility capability and an external device tone-processing capability;

a first image-data processing unit that processes first image data input from the image reading unit, including processing the first image data into unified image data having pre-defined characteristics that render the unified image data usable in each of the image writing unit and the external device, converting the supplemental information in the first format, into attribute information in a second format different from the first format, in accordance with an image quality mode set when the document is read by the image reading unit, and storing the unified image data with the attribute information in the storing unit; and a second image-data processing unit that processes received image data for supply to a target destination, by converting resolution and number of tones of the received image data to another resolution and number of tones, according to target reproducibility capability and target tone-processing capability of the destination, wherein in a case that the second image-data processing unit is converting target image data for outputting to the plotter unit, the second image-data processing unit converts the target image data of a specific resolution and specific number of tones into converted image data of converted data resolution and converted number of tones, according to the plotter unit reproducibility capability and the plotter unit tone-processing capability, respectively, of the plotter unit, and in a case that the second image-data processing unit is converting the target image data for outputting to the external device, the second image-data processing unit converts the target image data of the specific resolution and the specific number of tones into output image data of output data resolution and output number of tones, according to the external device reproducibility capability and the external device tone-processing capability, respectively, of the external device.

12. The multi-function apparatus according to claim 11, wherein the attribute information indicates a number of attributes of the unified image data, and wherein a number of the plural attributes indicated by the supplemental information is different from the number of attributes indicated by the attribute information.

13. The multi-function apparatus according to claim 11, wherein the attribute information indicates a number of attributes of the unified image data, and wherein a number of the plural attributes indicated by the supplemental information is greater than the number of attributes indicated by the attribute information.

* * * * *